US012798441B2

(12) United States Patent
Wang et al.

(10) Patent No.: US 12,798,441 B2

(45) Date of Patent: Nov. 17, 2026

(54) PROACTIVE ENERGY AND THERMAL MANAGEMENT FOR FUEL CELL VEHICLE

(71) Applicant: Ford Global Technologies, LLC, Dearborn, MI (US)

(72) Inventors: Hao Wang, Ann Arbor, MI (US); Michiel J. Van Nieuwstadt, Ann Arbor, MI (US); Jason Meyer, Canton, MI (US); Yixin Yao, Ann Arbor, MI (US); Chris Weinkauf, Roseville, MI (US); Ashley Peter Wiese, Ann Arbor, MI (US); Chenliu Stephen Lu, Northville, MI (US); Zeng Qiu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 18/488,453

(22) Filed: Oct. 17, 2023

(65) Prior Publication Data

US 2025/0121739 A1 Apr. 17, 2025

(51) Int. Cl.
*B60L 58/33* (2019.01)
*B60L 58/26* (2019.01)
(Continued)

(52) U.S. Cl.
CPC ............... *B60L 58/33* (2019.02); *B60L 58/26* (2019.02); *B60L 58/40* (2019.02);
(Continued)

(58) Field of Classification Search
CPC .......... B60L 58/33; B60L 58/26; B60L 58/40; H01M 8/04029; H01M 8/04126; H01M 8/04701; H01M 8/04776; H01M 8/04828; H01M 8/04932; H01M 8/04947; H01M 10/613; H01M 10/625; H01M 10/6568; H01M 16/006; H01M 2220/20; H01M 2250/20
See application file for complete search history.

(56) References Cited

U.S. PATENT DOCUMENTS 7,797,954 B2 * 9/2010 Duhme .............. B60H 1/00278
62/185
10,414,240 B2 9/2019 Eisele et al.
(Continued)

FOREIGN PATENT DOCUMENTS

DE 102017006158 A1 1/2019

OTHER PUBLICATIONS

KR20230030189A—Machine Translation (priority date: Aug. 25, 2021) (Year: 2023).*
DE102017213088B4—machine translation (Year: 2017).*

*Primary Examiner* — Christian Chace
*Assistant Examiner* — Richard Edwin Geist
(74) *Attorney, Agent, or Firm* — McCoy Russell LLP

(57) ABSTRACT

Methods and systems for managing power of a hybrid vehicle that includes a fuel cell and a traction battery are described. In one example, cooling of the battery and fuel cell may be adjusted preemptively before the hybrid vehicle reaches high load conditions to extend fuel cell durability over its life span, meanwhile the hybrid vehicle may meet driver demand for a longer period of time while operating at the high load and high ambient temperature conditions.

19 Claims, 8 Drawing Sheets

(51) Int. Cl.

| | |
|---|---|
| ***B60L 58/40*** | (2019.01) |
| ***H01M 8/04029*** | (2016.01) |
| ***H01M 8/04119*** | (2016.01) |
| ***H01M 8/04701*** | (2016.01) |
| ***H01M 8/04746*** | (2016.01) |
| ***H01M 8/04828*** | (2016.01) |
| ***H01M 8/04858*** | (2016.01) |
| ***H01M 10/613*** | (2014.01) |
| ***H01M 10/625*** | (2014.01) |
| ***H01M 10/6568*** | (2014.01) |
| ***H01M 16/00*** | (2006.01) |

(52) U.S. Cl.

CPC ... *H01M 8/04029* (2013.01); *H01M 8/04126* (2013.01); *H01M 8/04701* (2013.01); *H01M 8/04776* (2013.01); *H01M 8/04828* (2013.01); *H01M 8/04932* (2013.01); *H01M 8/04947* (2013.01); *H01M 10/613* (2015.04); *H01M 10/625* (2015.04); *H01M 10/6568* (2015.04); *H01M 16/006* (2013.01); *H01M 2220/20* (2013.01); *H01M 2250/20* (2013.01)

(56) References Cited

U.S. PATENT DOCUMENTS

| | | | | |
|---|---|---|---|---|
| 10,780,787 | B2 * | 9/2020 | Bandai | H01M 8/04992 |
| 10,870,368 | B2 | 12/2020 | Ing et al. | |
| 11,545,677 | B2 * | 1/2023 | Xiong | H01M 8/04701 |
| 11,813,963 | B2 * | 11/2023 | Hariharan | H01M 10/625 |
| 2019/0080924 | A1 | 3/2019 | Sherpa et al. | |
| 2020/0343601 | A1 | 10/2020 | Carlson et al. | |
| 2023/0099486 | A1 | 3/2023 | Wiese et al. | |
| 2024/0092225 | A1 * | 3/2024 | Sujan | B60L 58/16 |
| 2025/0070204 | A1 * | 2/2025 | Arya | H01M 8/04604 |

* cited by examiner

PROACTIVE ENERGY AND THERMAL MANAGEMENT FOR FUEL CELL VEHICLE

ACKNOWLEDGMENT OF GOVERNMENT SUPPORT

This material is based upon work supported by the U.S. Department of Energy under Award Number DE-EE0009858. The government has certain rights in the invention

FIELD

The present description relates to methods and a system for energy and thermal management of a fuel cell vehicle.

BACKGROUND AND SUMMARY

A vehicle may include a fuel cell and a traction battery to supply electric energy to an electric machine that propels the vehicle. The fuel cell and the traction battery may be subject to high ambient temperatures and high load conditions. Consuming larger amounts of electric power during higher ambient temperatures may increase thermal loads on the fuel cell and the traction battery, which in turn may increase cooling loads on cooling systems.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1:
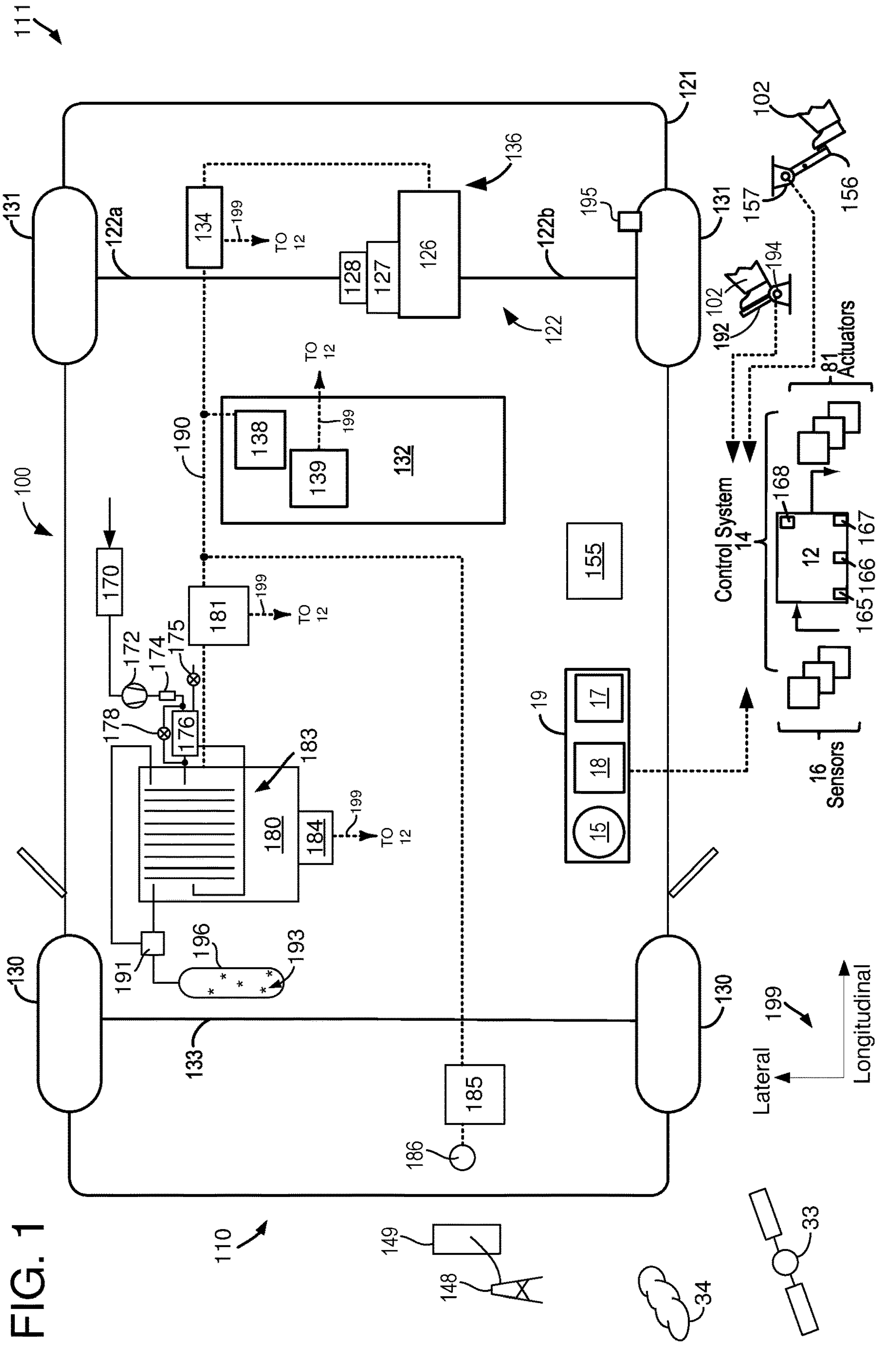
FIG. 1 is a schematic diagram of an example fuel cell vehicle.
Figure 2:
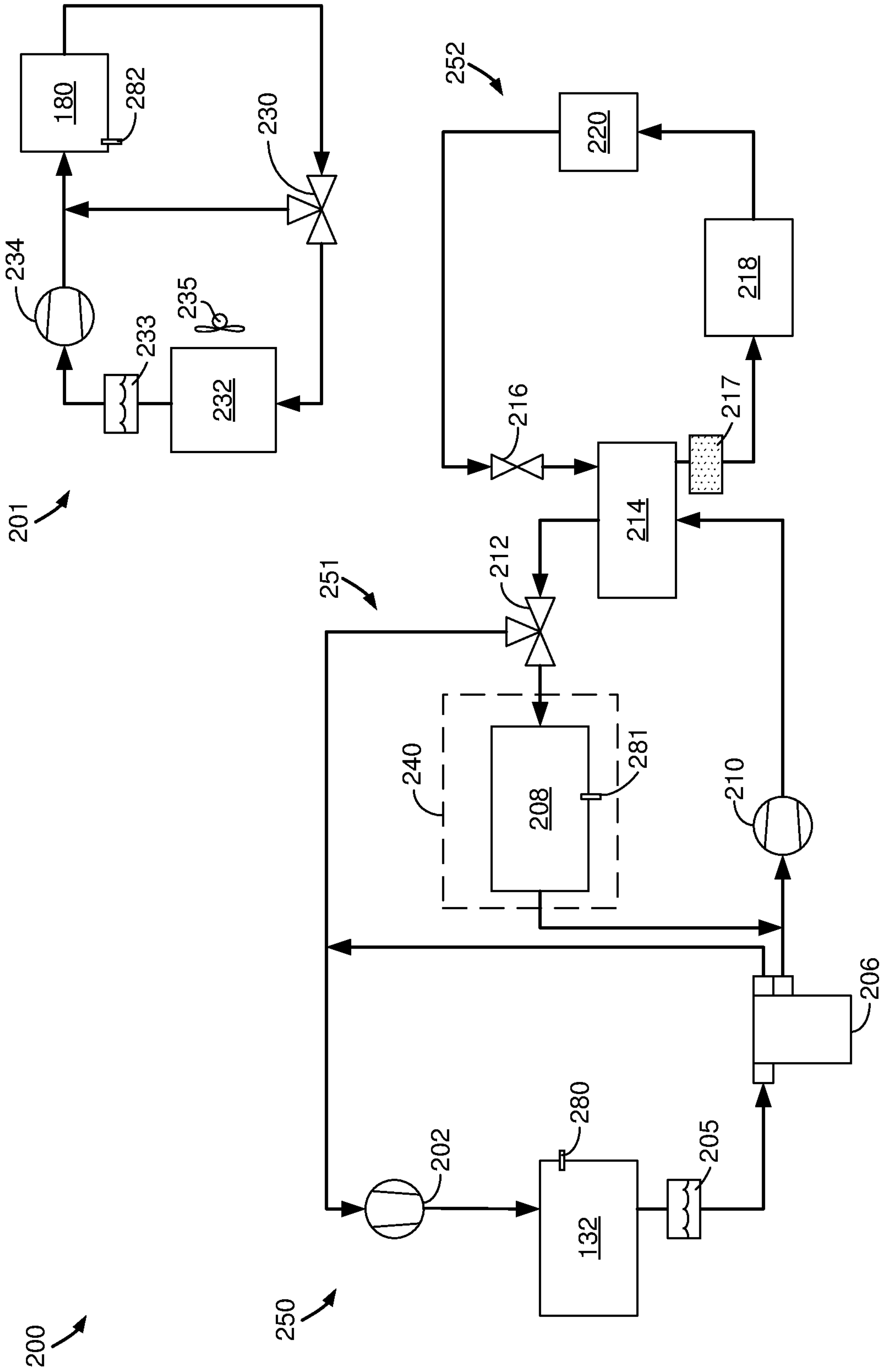
FIG. 2 shows a schematic of an example cooling system for a fuel cell vehicle.

The present description is related to energy and thermal management of a fuel cell vehicle. Specifically, energy use and thermal loading of the fuel cell vehicle may be managed to provide a higher level of performance during conditions of higher driver demand and higher ambient temperatures. In one example, the fuel cell vehicle may be configured as shown in FIG. 1. The fuel cell vehicle may include cooling systems as shown in FIG. 2. The fuel cell vehicle may operate according to the method of FIGS. 5-7 as shown in the operating sequences of FIGS. 3 and 4.

A fuel cell vehicle may be simultaneously exposed to high driver demand loads and high thermal loads. The higher driver demand loads may be generated when the vehicle's driver wishes to increase vehicle speed, haul a heavy load, or negotiate a hill while maintaining vehicle speed. The higher thermal loads may be due to cooling demands of a fuel cell and/or a traction battery while the fuel cell and traction battery strive to meet the driver demand. Additionally, the higher thermal loads may be due to higher ambient temperatures, which may reduce cooling of the fuel cell and traction battery. Further, cooling of a passenger cabin may also operate to lower cooling system capacity when ambient temperatures are high. If the cooling system lacks capacity to cool the fuel cell and the traction battery during high demands, the electric power output of the fuel cell and traction battery may be reduced so that a possibility of degrading the electrical system may be reduced.

The inventors herein have recognized the above-mentioned disadvantage and have developed a vehicle system, comprising: a fuel cell (FC); a coolant pump configured to supply coolant to the FC; and a controller including executable instructions stored in non-transitory memory that cause the controller to decrease a temperature of the FC at first time in response to a section of a travel route where a load on the FC is predicted to increase at a second time, where the second time is a predetermined amount of time after the first time.

By lowering a temperature of a fuel cell before demand on the fuel cell increases, it may be possible to operate a fuel cell vehicle at higher loads for a longer period of time as compared to trying to maintain the fuel cell at a constant temperature. Additionally, lowering the temperature of the fuel cell may allow a higher humidity level to be maintained in the fuel cell for a longer period of time so that a possibility of fuel cell degradation may be reduced.

The present description may provide several advantages. Specifically, the approach may increase an amount of time that a vehicle may operate at high driver demand conditions without degraded vehicle output. Further, the approach may extend an amount of time that vehicle systems operate under desired operating conditions while achieving higher driver demand levels. In addition, the approach may pre-condition fuel cell humidity levels to reduce a possibility of fuel cell degradation while operating at higher demand levels.

The above advantages and other advantages, and features of the present description will be readily apparent from the following Detailed Description when taken alone or in connection with the accompanying drawings.

Referring to FIG. 1, an example vehicle propulsion system 100 for vehicle 121 is shown. A front portion of vehicle 121 is indicated at 110 and a rear portion of vehicle 121 is indicated at 111. Vehicle propulsion system 100 includes a fuel cell (FC) and a traction battery 132 that provide electric propulsion energy to electric machine 126. However, in other examples, vehicle 121 may include two or more electric machines. Electric machine 126 may consume or generate electrical power depending on its operating mode. Throughout the description of FIG. 1, mechanical connections between various components are illustrated as solid lines, whereas electrical connections between various components are illustrated as dashed lines. Longitudinal and lateral directions are indicated at 199.

Vehicle propulsion system 100 includes a front axle 133 and a rear axle 122. In some examples, rear axle may comprise two half shafts, for example first half shaft 122*a*, and second half shaft 122*b*. Vehicle propulsion system 100 further has front wheels 130 and rear wheels 131. Rear wheels 131 may be driven via electric machine 126 and front wheels 130 are not driven in this example.

The rear axle 122 is coupled to electric machine 126. Rear drive unit 136 may transfer power from electric machine 126 to axle 122 resulting in rotation of drive wheels 131. Rear drive unit 136 may include a gear set 127 that includes a low gear and a high gear that are coupled to electric machine 126. Rear drive unit 136 may include differential 128 that receive torque from gear set 127 so that torque may be provided to axle 122*a* and to axle 122*b*. In some examples, an electrically controlled differential clutch (not shown) may be included in rear drive unit 136.

Electric machine 126 may receive electrical power from onboard electrical energy storage device 132 (e.g., a traction battery or a battery that provides power for propulsive effort of a vehicle) and FC 180. Furthermore, electric machine 126 may provide a generator function to convert the vehicle's kinetic energy into electrical energy, where the electrical energy may be stored at electric energy storage device 132 for later use by electric machine 126. An inverter system controller (ISC) 134 may convert alternating current (AC) generated by rear electric machine 126 to direct current (DC) for storage at the electric energy storage device 132 and vice versa. FC 180 is directly electrically coupled to DC/DC converter 181, and DC/DC converter 181 may adjust a voltage output of FC 180 to be compatible with a voltage of high voltage DC bus 190. DC/DC converter 181, electric energy storage device 132 and ISC 134 are directly electrically coupled to high voltage DC bus 190. Electric energy storage device 132 may be a battery, capacitor, inductor, or other electric energy storage device. Controller 12 may communicate with FC 180, DC/DC converter 181, electric energy storage device 132, and ISC 134 via controller area network (CAN) bus 199.

FC 180 as mentioned herein may include a plurality of polymer electrolyte membrane cells 183 that are electrically coupled in series to form a cell stack. The stack allows FC 180 to generate a voltage that is greater than the individual voltage output from a single fuel cell. In addition, FC 180 may include fuel cells that are arranged in parallel to increase electric current output of FC 180.

Hydrogen 193 stored in tank 196 may be supplied to FC 180 via injector/ejector 191. Air may also be supplied to FC 180 via air filter 170, compressor 172, and intercooler 174. Gas to gas humidifier 176 and humidifier bypass valve 178 may control the humidity level in FC 180. The electric output of FC 180 may be adjusted via adjusting the air flow rate through FC via throttle 175 and adjusting the amount of hydrogen supplied to the FC 180 via ejector 191. Controller 12 may adjust the FC actuators, or alternatively, a FC controller 184 may control the amount of power generated by the FC 18.

Electric energy storage device 132 may be supplied with electric charge from a stationary power grid 148 via EVSE 149. EVSE 149 may be electrically coupled to vehicle charging port 186. A charger 185 may convert AC power to DC power or adjust a voltage of DC power to a level that is appropriate for high voltage DC bus 190. Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Control system 14 may communicate with one or more of electric machine 126, energy storage device 132, charger 185, EVSE 149, FC 180, DC/DC converter 181, and ISC 134 via CAN bus 199 or another network. Control system 14 may receive sensory feedback information from one or more of electric machine 126, energy storage device 132, charger 143, FC 180, DC/DC converter 181, etc. Further, control system 14 may send control signals to one or more of charger 185, electric machine 126, energy storage device 132, FC 180, DC/DC converter 181, ISC 134, etc., responsive to this sensory feedback. Control system 14 may receive an indication of an operator requested output of the vehicle propulsion system from a human operator 102, or an autonomous controller 155. For example, control system 14 may receive sensory feedback from pedal position sensor 194 which communicates with driver demand pedal 192. Pedal 192 may refer schematically to a driver demand pedal. Similarly, control system 14 may receive an indication of an operator requested vehicle slowing via a human operator 102, or an autonomous controller 155. For example, control system 14 may receive sensory feedback from pedal position sensor 157 which communicates with wheel torque control pedal 156.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 12 may comprise a portion of a control system 14. In some examples, controller 12 may be a single controller of the vehicle. Control system 14 is shown receiving information from a plurality of sensors 16 (various examples of which are described herein including sensors shown in FIG. 2) and sending control signals to a plurality of actuators 81 (various examples of which are described herein including actuators shown in FIG. 2). As one example, sensors 16 may include tire pressure sensor(s) (not shown), wheel speed sensor(s) 195, light detecting and ranging (LIDAR) sensors, radio detecting and ranging (RADAR) sensors, cameras, sonic sensors, traction battery temperature sensor, FC temperature sensor, etc. In some examples, sensors associated with charger 143, electric machine 126, wheel speed sensor 195, etc., may communicate information to controller 12, regarding various states of electric machine operation. Actuators may include compressors, valves, fans, inverters, electric machines, etc. Controller 12 includes non-transitory memory (e.g., read-only memory) 165, random access memory 166, digital inputs/outputs 168, and a microcontroller 167.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites 33, and from the signal identify the geographical location of the vehicle. In some examples, the geographical location coordinates may be communicated to controller 12. The navigation system may also break a travel route into an actual total number of segments so that vehicle operation in the segments may be predicted. Navigation system 17 may communicate data from the travel route to controller 12. In some examples, navigation system 17 may receive travel route data from the cloud 34 (e.g., one or more remote servers) and communicate the travel route data to the navigation system 17 and controller 12.

Dashboard 19 may further include a display system 18 configured to display information to the vehicle operator. Display system 18 may comprise, as an example, a touch-screen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that utilize a physical apparatus, such as a key, that may be inserted into the operator interface 15 to start the electric machine 126 and to turn on the vehicle, or may be removed to shut down the electric machine 126 to turn off the vehicle. Still other examples may additionally or optionally use a start/stop button that is manually pressed by the operator to start or shut down the electric machine 126 to turn the vehicle on or off. In other examples, a remote electric machine start may be initiated remote computing device (not shown), for example a cellular telephone, or smartphone-based system where a user's cellular telephone sends data to a server and the server communicates with the controller 12 to start the engine.

Referring to FIG. 2, a schematic of a cooling system 200 for vehicle 121 is shown. Conduits or pipes between the various devices and flow of fluid/gas in the conduits or pipes are indicated by solid line arrows and they may allow fluid communication between connected devices. The devices shown in FIG. 2 may be actuated and/or controlled via controller 12 of FIG. 1.

Cooling system 200 includes two separate circuits for cooling different devices. A first cooling circuit 201 may cool FC 180. The first cooling circuit 201 may circulate a liquid coolant (e.g., glycol) through a radiator 232 that is cooled via ambient air. A coolant pump 234 provides motive power to circulate coolant through cooling circuit 201. Cooling circuit 201 also includes FC 180, bypass valve 230, radiator 232, coolant pump 234, FC temperature sensor 282, and electrically driven radiator fan 235 to control a temperature of FC 180.

Cooling system 200 also includes a second cooling circuit 250 for cooling a passenger cabin 240 and traction battery 132. Temperature of traction battery 132 may be determined via temperature sensor 280. Second cooling circuit 250 includes a coolant loop 251 and a refrigerant loop 252. Coolant loop 251 includes a first coolant pump 202 that may pump coolant through traction battery 132. Warm coolant that exits traction battery is directed to distribution valve 206 which may direct coolant back to first coolant pump 202 and/or second coolant pump 210. Second coolant pump 210 may circulate coolant through chiller 214, coolant bypass valve 212, and cooler 208. Cooler 208 may lower a temperature of air in passenger cabin 240. Coolant bypass valve 212 may direct chilled coolant to first coolant pump 202 and/or cooler 208. Coolant flowing through chiller 214 may be cooled via refrigerant that circulates through refrigerant loop 252. Refrigerant loop 252 includes an air conditioner condenser 220, an expansion valve 216, chiller 214, and compressor 218.

First cooling circuit 201 may cool FC 180 via activating coolant pump 234 to pump coolant 233 (e.g., glycol), which circulates coolant through FC 180 and cools heated coolant via radiator 232. Additionally, a position of bypass valve 230 may be adjusted to control a temperature of FC 180. In some examples, a speed of coolant pump 234 and speed of electrically driven radiator fan 235 may be adjusted to control cooling of FC 180. Further, in some examples, a speed of a fan (not shown) may be adjusted to control an air flow rate over radiator 232.

Second cooling circuit 250 may cool passenger cabin 240 and/or traction battery by activating compressor 218 and circulating refrigerant though second cooling circuit 250. Compressed refrigerant 217 (e.g., R134a) may exit compressor 218 and flow to condenser 220 where it may be cooled and condense to a pressurized liquid. The pressurized liquid may pass through expansion valve, thereby lowering a temperature of coolant 205 (e.g., glycol) that flows through chiller 214. Chilled coolant may flow through cooler 208, and air may be cooled by passing over cooler 208 and circulated in passenger cabin 240. A temperature of cooler 208 may be determined via temperature sensor 281. Chilled coolant may also flow through traction battery 132 where the chilled coolant extracts heat from traction battery 132.

The system of FIGS. 1 and 2 provides for a vehicle system, comprising: a fuel cell (FC); a coolant pump configured to supply coolant to the FC; and a controller including executable instructions stored in non-transitory memory that cause the controller to decrease a temperature of the FC at first time in response to a section of a travel route where a load on the FC is predicted to increase at a second time, where the second time is a predetermined amount of time ahead of the first time. In a first example, the vehicle system includes where the section of the travel route is a distance away from a present position of a vehicle that includes the FC, and further comprising: a gas to gas humidifier in fluidic communication with the FC; and additional executable instructions that cause the controller to increase a pressure within the gas to gas humidifier, decrease a pressure within the gas to gas humidifier, and decrease a flow through the gas to gas humidifier to increase humidity within the FC at the first time in response to the section of the travel route where the load on the FC is predicted to increase at the second time. In a second example that may include the first example, the vehicle system includes where the temperature of the FC is decreased via increasing a flow rate of a coolant to the FC and a radiator fan speed. In a third example that may include one or both of the first and second examples, the vehicle system includes where the temperature of the FC is decreased via adjusting a position of a valve. In a fourth example that may include one or more of the first through third examples, the vehicle system further comprises additional instructions to reduce a temperature of a traction battery in response to the second of the travel route where the load on the FC is predicted to increase. In a fifth example that may include one or more of the first through fourth examples, the vehicle system includes where the temperature of the traction battery is reduced via adjusting a position of an expansion valve. In a sixth example that may include one or more of the first through fifth examples, the vehicle charging system includes where a refrigerant is expanded through the expansion valve. In a sixth example that may include one or more of the first through fifth examples, the vehicle system includes where refrigerant cools a coolant that flows through the traction battery.

The system of FIGS. 1 and 2 also provides for a vehicle system, comprising: a fuel cell (FC); a coolant pump configured to supply coolant to the FC; a traction battery; and a controller including executable instructions stored in non-transitory memory that cause the controller to adjust a power split between the FC and the traction battery at a first vehicle position along a travel route, the first vehicle position ahead of a second vehicle position along the travel route, the second vehicle position being a section of the travel route where a load on a vehicle that includes the FC and the traction battery is predicted to increase. In a first example, the vehicle system includes where adjusting the power split includes increasing a maximum threshold FC output power. In a second example that may include the first example, the vehicle system includes where adjusting the power split includes decreasing a maximum threshold battery output power. In a third example that may include one or both of the first and second examples, the vehicle system includes where adjusting the power split includes decreasing a maximum threshold FC output power. This may allow the FC to operate for a shorter period of time at full load, decrease a possibility of FC membrane drying out, and extend FC durability. In a fourth example that includes one or more of the first through third examples, the vehicle system includes where adjusting the power split includes increasing a maximum threshold battery output power.

Figure 3:
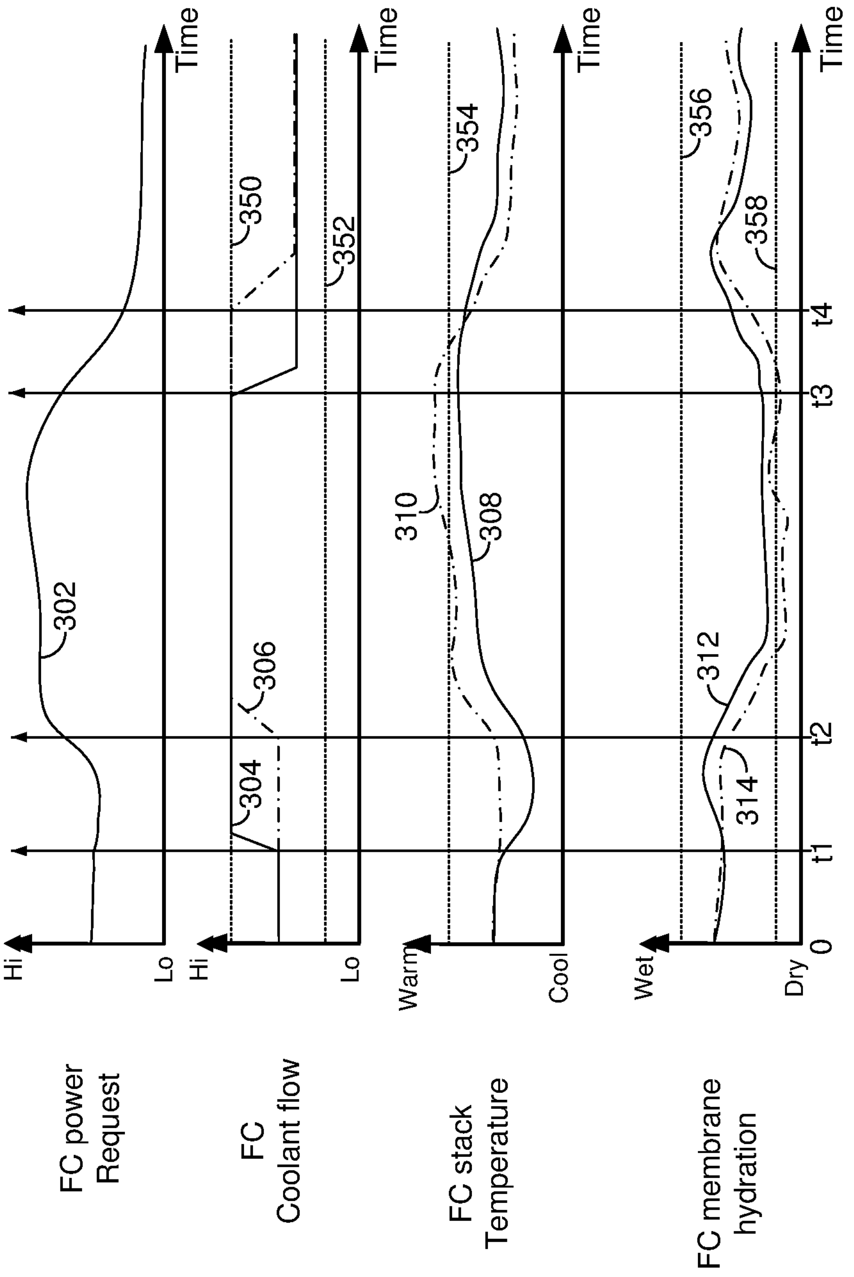
FIG. 3 shows an example operating sequence for a fuel cell vehicle.
Figure 5:
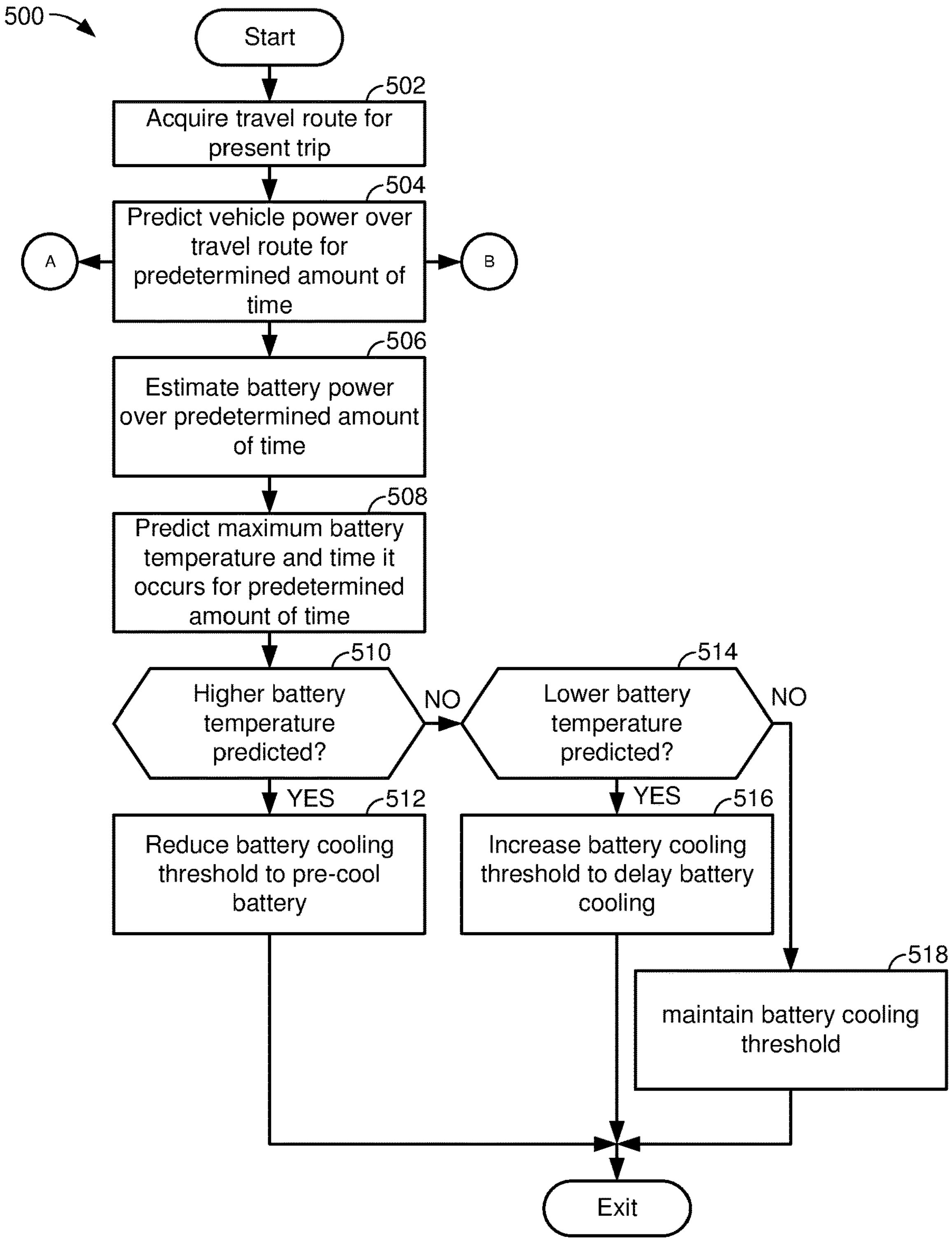
FIGS. 5-7 show a flow chart of an example method for operating a fuel cell vehicle.
Figure 6:
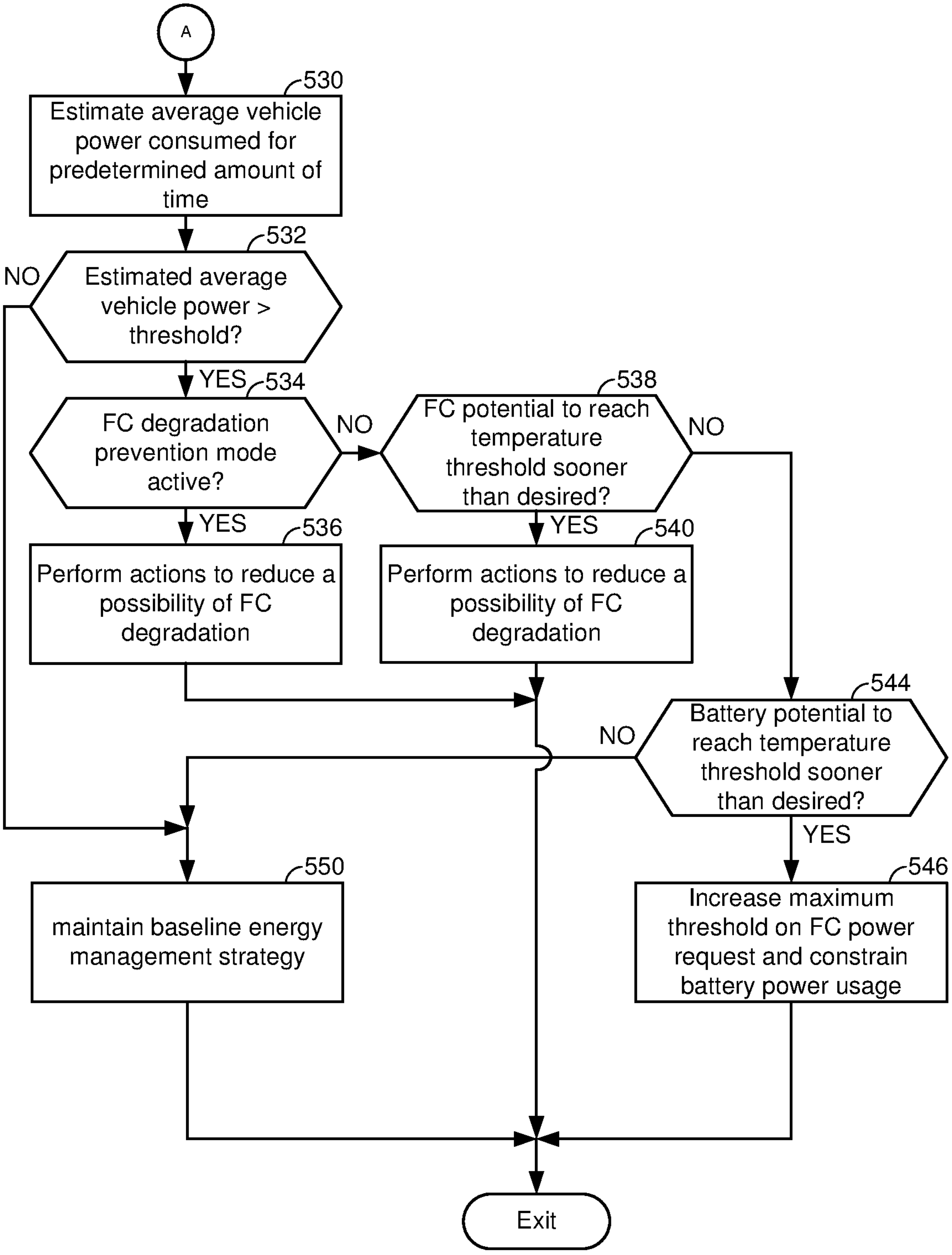
Figure 7:
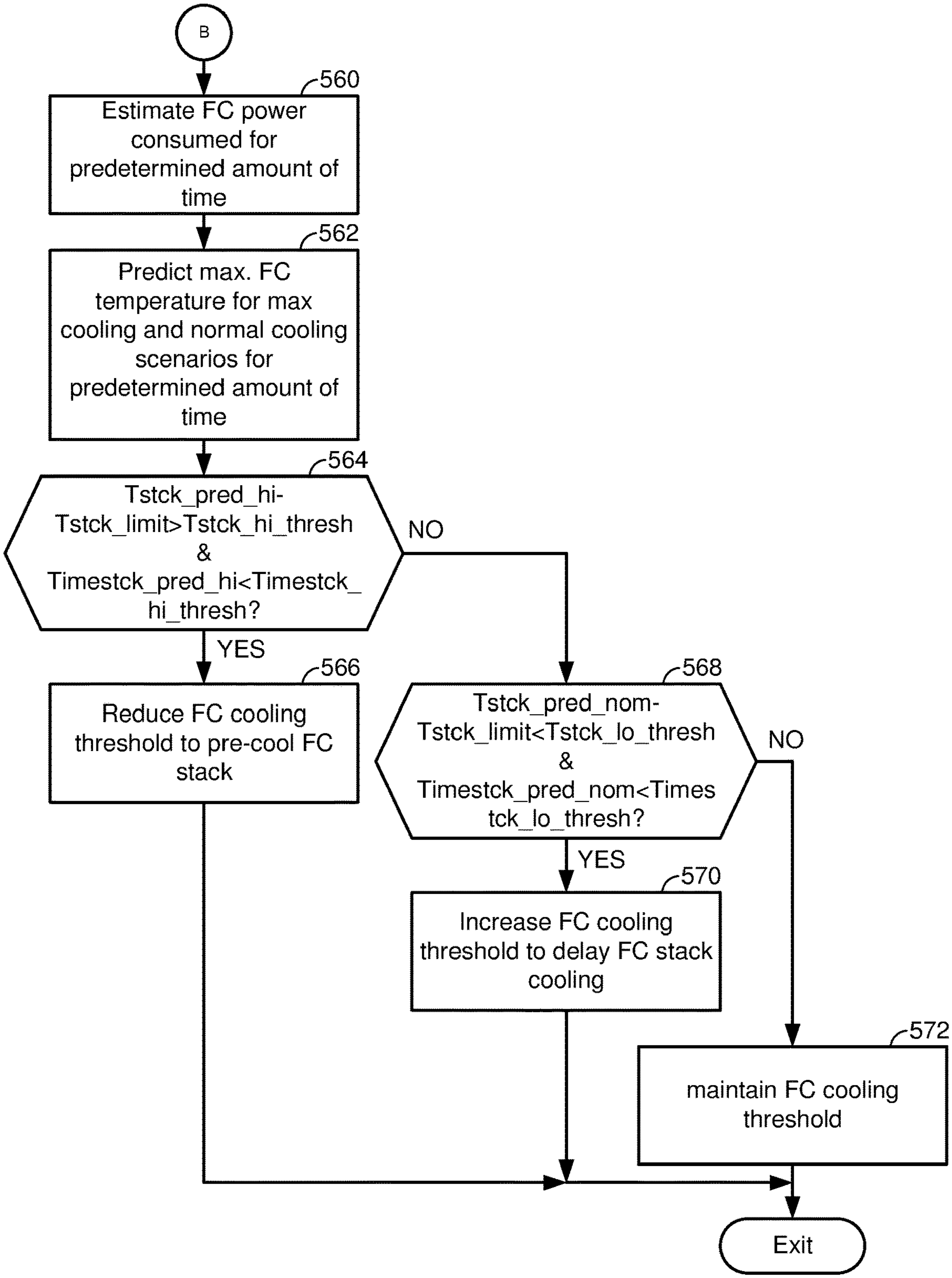

Referring now to FIG. 3, an operating sequence for the system of FIGS. 1 and 2 according to the method of FIGS. 5-7 is shown. The sequence of FIG. 3 may be generated via the system of FIGS. 1 and 2 in cooperation with the method of FIGS. 5-7. The plots of FIG. 3 are time aligned and the vertical lines represent times of interest during the sequence.

The first plot from the top of FIG. 3 is a plot of a FC power request versus time. The vertical axis represents FC power request and the FC power request amount increases in the direction of the vertical axis arrow. The horizontal axis represents time and time increases from the left side of the plot to the right side of the plot. Trace 302 represents the FC power request amount.

The second plot from the top of FIG. 3 is a plot of a FC coolant flow versus time. The vertical axis represents FC coolant flow and the FC coolant flow increases in the direction of the vertical axis arrow. The horizontal axis represents time and time increases from the left side of the plot to the right side of the plot. Trace 304 represents the FC coolant flow according to the method of FIGS. 5-7. Trace 306 represents baseline FC coolant flow that is not managed according to the method of FIGS. 5-7. Dashed line 350 represents a maximum FC coolant flow threshold. Dashed line 352 represents a minimum FC coolant flow threshold.

The third plot from the top of FIG. 3 is a plot of a FC stack temperature versus time. The vertical axis represents FC stack temperature and the FC stack temperature increases in the direction of the vertical axis arrow. The horizontal axis represents time and time increases from the left side of the plot to the right side of the plot. Trace 310 represents the FC stack temperature according to the method of FIGS. 5-7. Trace 308 represents baseline FC coolant flow that is not managed according to the method of FIGS. 5-7. Dashed line 354 represents a maximum FC temperature threshold.

The fourth plot from the top of FIG. 3 is a plot of a FC membrane hydration versus time. The vertical axis represents FC membrane hydration and the FC membrane hydration increases in the direction of the vertical axis arrow. The horizontal axis represents time and time increases from the left side of the plot to the right side of the plot. Trace 312 represents the FC membrane hydration according to the method of FIGS. 5-7. Trace 314 represents baseline FC membrane hydration that is not managed according to the method of FIGS. 5-7. Dashed line 356 represents a maximum FC membrane hydration threshold. Dashed line 358 represents a minimum FC membrane hydration threshold.

At time t0, the FC power request is at a medium level and the FC coolant flow for baseline operation and according to the method of FIGS. 5-7 is at a medium level. The FC stack temperature is also at a medium level for baseline operation and for operation according to the method of FIGS. 5-7. The FC membrane hydration level is at a higher medium level for baseline operation and for operation according to the method of FIGS. 5-7.

At time t1, the method of FIGS. 5-7 predicts an increase in the FC power request before the FC power request actually increases in response to driver demand. The forecast increase in FC power causes the method of FIGS. 5-7 to increase the FC coolant flow rate, thereby causing FC stack temperature to begin to decline. Additionally, the method of FIGS. 5-7 also increases the FC membrane hydration by increasing a humidity level in air that is supplied to the FC so that the possibility of fuel cell degradation may be reduced. A possibility of polymer electrolyte membrane degradation may increase when the polymer electrolyte membranes are exposed to dry air. By pre-conditioning (e.g., cooling the FC stack to a lower temperature prior to a sustained section of a travel route where driver demand load is high) the FC stack membranes and humidifier, the FC cell stack may dry out slower because lower FC temperature increases water vapor activity within the FC. In addition, pressure of air and the humidity level of air supplied to the RC cell stack may be increased prior to the vehicle reaching the higher load section of the travel route. In this way, the FC membranes may absorb additional water so that a humidity level of air supplied to the FC may be increased.

At time t2, the FC power request reaches a threshold level where FC coolant flow is increased according to baseline operation. This slows the rate of FC stack temperature rise. The baseline FC membrane hydration level also starts to decrease shortly before time t2. Since the method of FIGS. 5-7 increased the FC coolant flow beginning at time t1, the fuel cell stack temperature according to the method of FIGS. 5-7 is lower than the fuel cell stack temperature according to baseline operation. Further, the FC membrane hydration level for the method of FIGS. 5-7 is greater than the FC membrane hydration level according to baseline operation. This operation can mitigate potential for membrane dry-out from the baseline case, which may lead to significant power output reduction and expedited membrane degradation.

Between time t2 and time t3, the FC power request increases and gradually decreases as time t3 is approached. The FC coolant flows are maximized and the FC stack temperature for the baseline operation exceeds threshold 354 while FC stack temperature according to the method of FIGS. 5-7 increases but remains below threshold 354. The FC membrane hydration level for baseline operation falls below threshold 358 and the FC membrane hydration level for operation according to the method of FIGS. 5-7 remains above threshold 358 because preconditioning of the fuel cell stack managed to keep the FC cooler during the high-load region, less water was vaporized in the FC and purged out from the system due to the lower temperature FC. As such, more water was retained inside the FC stack membranes.

At time t3, the method of FIGS. 5-7 predicts or foresees a decrease in the FC power request before the FC power request actually decreases significantly in response to driver demand. The forecast decrease in FC power causes the method of FIGS. 5-7 to decrease the FC coolant flow rate, thereby causing a slower FC stack temperature decrease as compared to the baseline operation. Additionally, the method of FIGS. 5-7 also increases the FC membrane hydration as water vaporization is reduced so that the possibility of FC degradation may be reduced. The hydration increase may be due to the reduction in FC power output demand, which reduces FC temperature and loss of water from the FC. The baseline FC coolant flow remains at a higher level so that the baseline FC stack temperature is reduced sooner as compared to FC stack temperature according to the method of FIGS. 5-7.

At time t4, the method of FIGS. 5-7 has reached a steady lower FC coolant flow and the FC stack temperature continues to decrease according to the method of FIGS. 5-7. The FC membrane hydration level also continues to increase according to the method of FIGS. 5-7. Conversely, the FC coolant flow for the baseline method just begins to be reduced. The higher FC coolant flow has caused FC stack temperature to decline at a faster rate as compared to the method of FIGS. 5-7. Further, the FC membrane hydration level for the baseline method is lower than the FC membrane hydration level according to the method of FIGS. 5-7.

In this way, the method of FIGS. 5-7 may increase FC coolant flow to lower FC temperature before high load operation begins so that the system may operate for a longer period of time at a high power level without exceeding a FC temperature threshold. Thus, the method of FIGS. 5-7 may permit to meet driver demand for a longer period of time, thereby increasing customer satisfaction and vehicle performance.

Figure 4:
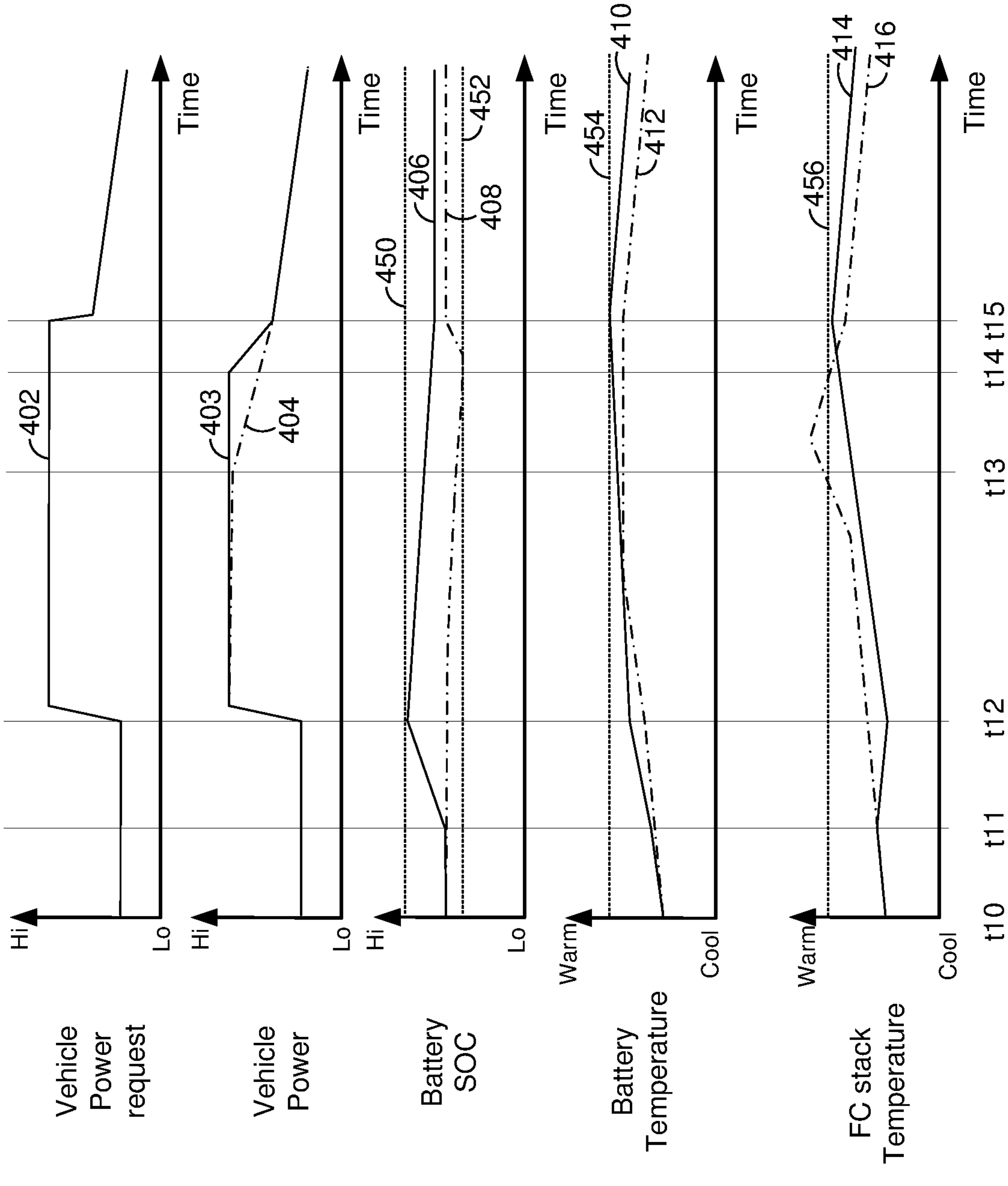
FIG. 4 shows a second example operating sequence for a fuel cell vehicle.

Referring now to FIG. 4, an operating sequence for the system of FIGS. 1 and 2 according to the method of FIGS. 5-7 and a baseline method is shown. The sequence of FIG. 4 may be generated via the system of FIGS. 1 and 2 in cooperation with the method of FIGS. 5-7. The plots of FIG. 4 are time aligned and the vertical lines represent times of interest during the sequence.

The first plot from the top of FIG. 4 is a plot of a vehicle power request versus time. The vertical axis represents vehicle power request and the vehicle power request amount increases in the direction of the vertical axis arrow. The horizontal axis represents time and time increases from the left side of the plot to the right side of the plot. Trace 402 represents the vehicle power request amount.

The second plot from the top of FIG. 4 is a plot of a vehicle power versus time. The vertical axis represents vehicle power and the vehicle power amount increases in the direction of the vertical axis arrow. The horizontal axis represents time and time increases from the left side of the plot to the right side of the plot. Trace 403 represents the vehicle power amount according to the method of FIGS. 5-7. Trace 404 represents the vehicle power amount according to a baseline method.

The third plot from the top of FIG. 4 is a plot of traction battery state of charge (SOC) versus time. The vertical axis represents traction battery state of charge and the battery state of charge increases in the direction of the vertical axis arrow. The horizontal axis represents time and time increases from the left side of the plot to the right side of the plot. Trace 406 represents the battery SOC according to the method of FIGS. 5-7. Trace 408 represents baseline battery SOC according to a baseline method (e.g., not the method of FIGS. 5-7). Dashed line 550 represents a maximum battery SOC threshold. Dashed line 452 represents a minimum battery SOC threshold.

The fourth plot from the top of FIG. 4 is a plot of traction battery temperature versus time. The vertical axis represents battery temperature and the battery temperature increases in the direction of the vertical axis arrow. The horizontal axis represents time and time increases from the left side of the plot to the right side of the plot. Trace 410 represents the battery temperature according to the method of FIGS. 5-7. Trace 412 represents baseline battery temperature according to a baseline method. Dashed line 454 represents a maximum battery temperature threshold.

The fifth plot from the top of FIG. 4 is a plot of a FC stack temperature versus time. The vertical axis represents FC stack temperature and the FC stack temperature increases in the direction of the vertical axis arrow. The horizontal axis represents time and time increases from the left side of the plot to the right side of the plot. Trace 414 represents the FC stack temperature according to the method of FIGS. 5-7. Trace 416 represents baseline FC coolant flow according to a baseline method. Dashed line 456 represents a maximum FC temperature threshold.

At time t10, the vehicle power request is at a medium level and the vehicle power according to the method of FIGS. 5-7 is equivalent to the vehicle power request. The vehicle power according to the baseline method is also equivalent to the vehicle power request. The battery SOC is at a medium level and the battery temperature is at a medium temperature. The FC stack temperature is at a medium level.

At time t11, the method of FIGS. 5-7 predicts an increase in the vehicle power request before the vehicle power request actually increases in response to driver demand. The predicted increase in the vehicle power request causes the method of FIGS. 5-7 to increase the traction battery SOC, thereby increasing the amount of electric energy that may be available when the actual vehicle power output increases. The vehicle power request and the vehicle power according to the method of FIGS. 5-7 are unchanged. Further, the vehicle power according to baseline operation is unchanged. In this example, the battery SOC is increased according to the method of FIGS. 5-7 via increasing the requested power output of the FC. At the same time, the thermal management system extracts additional heat from the traction battery and the FC to maintain battery temperature and FC stack temperature under their respective thresholds so that over temperature conditions may be reduced over the entire travel route according to predicted temperatures for the traction battery and the FC. In this example, the traction battery temperature increases according to the method of FIGS. 5-7 at a higher rate than the battery temperature according to the baseline method, but in other examples where there is sufficient traction battery cooling the traction battery temperature for the method of FIGS. 5-7 may be lower than for the baseline system. The FC stack temperature according to the method of FIGS. 5-7 begins to decrease as cooling for the FC is increased at time t11 and the FC stack temperature according to the baseline method continues to increase.

At time t12, the vehicle power request is increased and the vehicle power according to the method of FIGS. 5-7 increases to match the vehicle power request. Likewise, the baseline method vehicle power is increased to match the vehicle power request. The battery SOC according to the method of FIGS. 5-7 begins to decrease as battery power is consumed to propel the vehicle. The baseline method battery SOC begins decreasing at a relatively slow rate. The baseline method battery temperature and the battery temperature according to the method of FIGS. 5-7 continue to increase. The baseline method FC stack temperature continues to increase and the FC stack temperature according to the method of FIGS. 5-7 begins to increase as FC output is increased to meet the vehicle power request.

Between time t12 and time t13, the vehicle power request levels off as do the vehicle power according to the method of FIGS. 5-7 and the baseline method vehicle power. The traction battery SOC for the method of FIGS. 5-7 and the baseline method traction battery power each decrease. The battery temperature for the method of FIGS. 5-7 increases as does the baseline method battery temperature. Similarly, the FC stack temperature for the method of FIGS. 5-7 increases and the baseline method FC stack temperature continues to increase.

At time t13, the baseline method FC stack temperature exceeds dashed line 456 so the vehicle power for the baseline method is reduced to lower a possibility of FC degradation. The vehicle power for the baseline method is reduced even though the requested vehicle power is unchanged. The reduction in vehicle power for the baseline method is performed to reduce a possibility of FC degradation. The vehicle power for the method of FIGS. 5-7 is unchanged because the FC stack temperature for the method of FIGS. 5-7 is less than dashed line 456 at time t13. The battery SOC for the baseline method and method of FIGS. 5-7 continue to decline. The battery temperatures for the baseline method and the method of FIGS. 5-7 are increasing, but remain below dashed line 454. The higher battery SOC allows the battery output to be increased while FC output is at a lower level for the method of FIGS. 5-7 as compared to the baseline method.

At time t14, the traction battery temperature for the method of FIGS. 5-7 has reached dashed line 454 so vehicle power is reduced to lower a possibility of traction battery degradation. The requested vehicle power remains unchanged. The battery SOC for the baseline method and the method of FIGS. 5-7 continues to decrease as the traction battery provides power to propel the vehicle. The traction battery temperature for the baseline method remains below dashed line 454. The FC stack temperature for the baseline method and the method of FIGS. 5-7 remain below dashed line 456.

At time t15, the requested vehicle power is reduced ending the period of high sustained driver demand. The vehicle power for the baseline method and the method of FIGS. 5-7 converge with the requested vehicle power. The battery SOC for the baseline method and for the method of FIGS. 5-7 remains below dashed line 450. The battery temperature rate of decent for the baseline method and for the method of FIGS. 5-7 increases after time t15 as does the FC stack temperature for the baseline method and the method of FIGS. 5-7.

In this way, the method of FIGS. 5-7 may initially increase battery SOC so that the battery may be able to supply charge for a longer period of time and at a higher rate. This may allow the FC stack temperature to remain lower since the load on the FC may be reduced as compared to if preemptive actions are not taken. Consequently, vehicle power output may meet requested vehicle power output for a longer period of time as compared to if vehicle load conditions are not predicted.

Referring now to FIGS. 5-7, a method for proactive energy and thermal management for a fuel cell vehicle is shown. The method of FIGS. 5-7 may be included in the system of FIGS. 1 and 2 as executable instructions stored in non-transitory memory of a controller. Further still, portions of the method of FIGS. 5-7 may be actions taken in the physical world by a controller and/or a human.

At 502, method 500 acquires travel route data for the subject vehicle. The travel route data may be based on the vehicle's present geographical position and the vehicle's geographical destination. The vehicle's occupants or a scheduler may input the vehicle's destination into the vehicle's navigation system. The navigation system may break the travel route down into one or more segments, where each segment corresponds to a predetermined travel route distance (e.g., 1 kilometer) or time, but were the segments may be different distances. Thus, for example, a travel route of 10 kilometers may be partitioned into ten time segments or ten 1 kilometer segments, or alternatively, six 1 kilometer segments and two 2 kilometer segments. A data array or vector (e.g., a collection of values or variables stored in controller memory such that each value or variable may be referenced via a mathematical formula) may include data for each travel route segment and the navigation system may send the data array to the vehicle controller. The data in the array may include, but is not constrained to a vehicle speed constraint and road grade. Method 500 proceeds to 504.

At 504, method 500 predicts the amount of power that the vehicle will consume to travel a predetermined distance of the vehicle travel route. For example, method 500 may predict an amount of power that the vehicle will consume to travel 5 kilometers. In one example, method 500 may apply a vehicle model to estimate the amount of power that the vehicle will consume to travel the predetermined distance. The model may reference a table or a function that outputs vehicle power as a function of vehicle speed and road grade. The model outputs a value for each segment of the travel route for the predetermined distance that the vehicle is predicted to travel. Alternatively, the model may output an energy consumption amount for the vehicle for each segment of the vehicle travel route. The vehicle power amount for a particular segment of the travel route may be determined by multiplying the average vehicle speed during the particular travel route segment by the amount of energy that is consumed by the vehicle over the travel route segment.

In another example, method 500 may receive vehicle power consumption data from a cloud server. The cloud server may receive vehicle power consumption, vehicle energy consumption, speed, and other data from other vehicles of the same type and send the power data to the vehicle. In still another example, the power data may be provided from data that the vehicle stored to memory or sent to the cloud during a prior negotiation of the same or similar travel route. Method 500 proceeds to 530 of FIG. 6, 560 of FIG. 7, and 506 of FIG. 5.

At 506, method 500 estimates an amount of traction battery power that will be consumed at each segment of the travel route over the predetermined amount of time that the vehicle is traveling over the travel route. In one example, method 500 may estimate traction battery power consumption from the present time to the predetermined amount of time in the future for each travel route segment. The amount of traction battery power that is consumed for a particular travel route segment may be determined by multiplying the amount of vehicle power consumed during the travel segment to meet driver demand by a weighting factor for the battery. The weighting factor may be based on battery state of charge (SOC) and battery temperature. The weighting factor may be stored in a table or function in controller memory and the table or function may be referenced by battery SOC and battery temperature. The weighting factors (e.g., scalar real numbers) may be empirically determined via operating a vehicle on a dynamometer with different battery SOC and temperature levels and adjusting weighting factor values so that vehicle performance and objectives may be met. Method 500 proceeds to 508 after battery power consumption for each travel segment of the travel route is determined.

At 508, method 500 predicts a maximum battery temperature and a time that the maximum battery temperature occurs from the present time to the predetermined time in the future. In one example where three levels of constant heat transfer between the battery and battery coolant are used for likelihood assessment of a change in cooling demand occurring, battery cell temperature prediction values may be normalized by model monitoring module using three battery cell temperature predictions, one prediction for each level of constant heat transfer, such that a comparison between an observed battery cell temperature and a predicted battery cell temperature may be more accurate than traditional approaches with respect to the three levels of constant heat transfer. In one example, given an observed level of heat transfer between the battery and battery coolant measured by a sensor, where the observed level of heat transfer is between two threshold levels of heat transfer, a normalized battery cell temperature prediction at a future instance may be calculated via equation 1 below.

$$T_{cell}^{norm}(k+1) = T_{cell}^{norm}(k) + (1-\alpha)\left(T_{cell}^{1}(k+1) - T_{cell}^{2}(k+1) - T_{cell}^{2}(k)\right) \quad (1)$$

The value α may be calculated via equation 2 below.

$$\alpha = \frac{Q_{chill}^{obs} - Q_{chill}^{1}}{Q_{chill}^{2} - Q_{chill}^{1}} \quad (2)$$

In equation (1), $$T_{cell}^{norm}(k)$$

represents a normalized battery cell temperature prediction at a time k. In one example, k represents a present time.

$$T_{cell}^{norm}(k+1)$$

represents a normalized battery cell temperature prediction one increment of time (e.g., 1 minute) after the normalized battery cell temperature prediction at time k.

$$T_{cell}^{1}(k+1)$$

represents a battery cell temperature prediction one increment of time after time k assuming a heat transfer magnitude between the battery case and battery coolant at a first threshold.

$$T_{cell}^{2}(k+1)$$

represents a battery cell temperature prediction one increment of time after time k assuming a heat transfer magnitude between the battery case and battery coolant at a second threshold.

$$T_{cell}^{2}(k)$$

represents a battery cell temperature prediction at time k assuming a heat transfer magnitude between the battery case and battery coolant at the second threshold. In equation (2), $$Q_{chill}^{obs}$$

represents an observed magnitude of heat transfer between the battery case and battery coolant.

$$Q_{chill}^{1}$$

represents a first threshold of heat transfer between the battery case and battery coolant.

$$Q_{chill}^{2}$$

represents a second threshold of heat transfer between the battery case and battery coolant. In one example, the first threshold may be a lesser magnitude than the second threshold such that the observed magnitude of heat transfer is greater than the first threshold and less than the second threshold.

A model monitoring module may request updated predictions from cloud server 34 if an absolute value of a difference between a present prediction and an observation exceeds a modifiable variance threshold. Cloud server 34 may provide a plurality of data to controller 12 including updated route information and updated prediction models taking current observational data into consideration. Calls to cloud server 34 may include providing data from controller 12 such as battery case temperature, battery SOC, and remaining route distance. Method 500 proceeds to 510.

At 510, method 500 judges whether a higher battery temperature is predicted during the predetermined amount of time. Method 500 may make the judgement according to the following conditions: Tbatt_pred_hi–Tbatt_limit>Tbatt_hi_thresh AND Timebatt_pred_hi<Timebatt_hi_thresh, where Tbatt_pred_hi is the greatest battery temperature predicted during the interval in which battery temperature is predicted, Tbatt_limit is a battery temperature threshold, Tbatt_hi_thresh is a battery high temperature threshold, Timebatt_pred_hi is a time where the predicted battery temperature is greatest during the predetermined time interval in which battery temperature is predicted, Timebatt_hi_thresh is a time threshold for a high battery temperature, and AND is a logical and operator. If method 500 judges that Tbatt_pred_hi–Tbatt_limit>Tbatt_hi_thresh AND Timebatt_pred_hi<Timebatt_hi_thresh, the answer is yes and method 500 proceeds to 512. Otherwise, the answer is no and method 500 proceeds to 514. A yes answer indicates battery temperature is predicted to exceed a threshold value so that pre-cooling of the battery may be desirable so that the battery may operate at a higher load for a longer period of time. A no answer indicates that the battery temperature is not predicted to exceed the threshold temperature during the time interval that battery temperature is predicted.

At 512, method 500 reduces a traction battery cooling threshold temperature to pre-cool the battery before high demand conditions occur. By lowering the traction battery cooling threshold temperature, method 500 may cause one or more of the following actions: increase coolant flow through coolant pump 202 by increasing speed of coolant pump 202, increasing coolant flow through coolant pump 202 via opening valve 212, increasing coolant flow through coolant pump 202 via increasing a speed of coolant pump 210, increasing cooling of coolant via opening expansion valve 216 and increasing a speed of compressor 218. By pre-cooling the battery, it may increase the amount of time that the battery may operate at higher load (current) conditions. Accordingly, the vehicle may be able to meet driver demand torque for a longer period of time by pre-cooling the traction battery. Method 500 proceeds to exit.

At 514, method 500 judges whether Tbatt_pred_nom−Tbatt_limit<Tbatt_lo_thresh AND Timebatt_pred_nom<Timebatt_lo_thresh, where Tbatt_pred_nom is a nominal battery temperature during the predetermined time interval that battery temperature is predicted, Tbatt_limit is a battery temperature threshold, Tbatt_lo_thresh is a battery low temperature threshold, Timebatt_pred_nom is a time where the predicted battery temperature is lowest during the interval in which battery temperature is predicted, Timebatt_lo_thresh is a time threshold for a low battery temperature, and AND is a logical and operator. If method 500 judges that Tbatt_pred_nom−Tbatt_limit<Tbatt_lo_thresh AND Timebatt_pred_nom<Timebatt_lo_thresh, the answer is yes and method 500 proceeds to 516. Otherwise, the answer is no and method 500 proceeds to 518. A yes answer indicates battery temperature is predicted to be less than a lower threshold value so that the battery may tolerate operating at a higher temperature for a time period. A no answer indicates that the battery temperature is not predicted to be less than a low temperature threshold during the time interval that battery temperature is predicted.

At 516, method 500 increases a traction battery cooling threshold temperature to delay battery cooling so that energy may be saved during conditions when the battery is not predicted to reach a threshold temperature for an upcoming portion of the travel route. By increasing the traction battery cooling threshold temperature, method 500 may cause one or more of the following actions: decrease coolant flow through coolant pump 202 by decreasing speed of coolant pump 202, decreasing coolant flow through coolant pump 202 via opening valve 212, decreasing coolant flow through coolant pump 202 via decreasing a speed of coolant pump 210, decreasing cooling of coolant via closing expansion valve 216 and decreasing a speed of compressor 218. By pre-cooling the battery, it may increase the amount of time that the battery may operate at higher load (current) conditions. Accordingly, the vehicle may be able to meet driver demand torque for a longer period of time by pre-cooling the traction battery. Method 500 proceeds to exit.

At 518, method 500 maintains the present traction battery cooling threshold (e.g., a temperature that the traction battery is not to exceed). Method 500 proceeds to exit.

At 530, method 500 estimates an average vehicle power consumed from the present time to the predetermined amount of time in the future. In one example, method 500 estimates the average vehicle power consumed for the predetermined amount of time by receiving average vehicle power consumption values for each segment of a travel route from a cloud server. The values received from the cloud server may be received from data transmitted to the cloud server by other similar vehicles. Alternatively, method 500 may retrieve average vehicle power levels for the route segments being traveled from prior trip data of the present vehicle. In still other examples, a model may generate an average vehicle power level for each travel route segment based on average vehicle speed constraint, road grade, and vehicle mass. Method 500 proceeds to 532.

At 532, method 500 judges whether the average vehicle power consumed from the present time to the predetermined time in the future is greater than a threshold amount of time. If so, the answer is yes and method 500 proceeds to 534. Otherwise, the answer is no and method 500 proceeds to 550.

At 534, method 500 judges whether FC degradation prevention mode is active. FC degradation prevention mode is a mode that slows down the FC system degradation rate across the FC life span by preventing running under select conditions for the FC system. For example, at elevated ambient temperatures, running the FC at full power output for a long time is may increase the possibility of drying out the FC polymer electrolyte membranes, which may lead to degradation of the FC membrane stack. If degradation occurs, for a given electric current draw from the fuel cell system, the net FC output power decreases. Method 500 may judge that FC degradation prevention mode is active if FC is predicted to run at maximum driver demand load for longer than a threshold amount of time for the upcoming trip, the FC is predicted to be running at full power for longer than a threshold amount of time under baseline strategy. If method 500 judges that degradation prevention mode is active, the answer is yes and method 500 proceeds to 536. Otherwise, the answer is no and method 500 proceeds to 538.

At 536, method 500 performs actions to reduce a possibility of FC degradation. The actions may include but are not constrained to reducing a maximum threshold for a FC power request, increasing a traction battery SOC threshold value and adjusting power split logic (e.g., controls what percentage of driver demand power is provided via the FC and what percentage of driver demand power is provided via the traction battery) to allow the traction battery to reach and be sustained at or about a higher traction battery SOC threshold (e.g., SOC_hi (maximum traction battery SOC threshold) as a function of average vehicle power over a predetermined amount of time (P_VehAvg_Pred). By increasing the traction battery SOC threshold, the battery may output a maximum discharge level for a longer period of time. Further, by adjusting the power split logic to increase the fraction of driver demand power that is provided by the traction battery, load on the FC may be reduced, thereby reducing a possibility of FC degradation. Method 500 proceeds to exit.

At 538, method 500 judges whether the FC has potential to reach a temperature threshold sooner than may be desired. In one example, method 500 judges if Tbatt_pred_hi−Tbatt_limit>0 AND Tstck_pred_hi−Tstck_limit>0 AND Timebatt_pred_hi−Timestck_pred_hi>Timestck_derate_hi. If so, the answer is yes and method 500 proceeds to 540. If not, the answer is no and method 500 proceeds to 544. Tbatt_pred_hi is the greatest battery temperature predicted during the interval in which battery temperature is predicted. Tbatt_limit is a battery temperature threshold. Tstck_pred_hi is the greatest FC temperature that is predicted during the interval in which FC temperature is predicted. Tstck_limit is a FC temperature threshold. Timebatt_pred_hi is a time where the predicted battery temperature is greatest during the predetermined time interval in which battery temperature is predicted. Timestck_pred_hi is a time where the predicted FC temperature is greatest during the predetermined time interval in which FC temperature is predicted. Timestck_derate_hi is a time where FC derating (e.g., reduction in power output) is predicted.

At 540, method 500 performs actions to reduce a possibility of FC degradation. The actions may include but are not constrained to reducing a maximum threshold for a FC power request, increasing a traction battery SOC threshold value and adjusting power split logic (e.g., controls what percentage of driver demand power is provided via the FC and what percentage of driver demand power is provided via the traction battery) to allow the traction battery to reach and be sustained at or about a higher traction battery SOC threshold (e.g., SOC_hi (maximum traction battery SOC threshold) as a function of average vehicle power over a predetermined amount of time (P_VehAvg_Pred). By increasing the traction battery SOC threshold, the traction battery may operate for a longer period of time at a maximum discharge rate. Further, by adjusting the power split logic to increase the fraction of driver demand power that is provided by the traction battery, load on the FC may be reduced, thereby reducing a possibility of FC degradation. Method 500 proceeds to exit.

At 544, method 500 judges whether traction battery temperature is predicted to reach a temperature threshold that is not to be exceeded sooner than may be desired. In one example, method 500 judges if Tbatt_pred_hi−Tbatt_limit>0 AND Tstck_pred_hi−Tstck_limit>0 AND Timestck_pred_hi−Timebatt_pred_hi>Time_battderate_hi. If so, the answer is yes and method 500 proceeds to 546. If not, the answer is no and method 500 proceeds to 550. Tbatt_pred_hi is the greatest battery temperature predicted during the interval in which battery temperature is predicted. Tbatt_limit is a battery temperature threshold. Tstck_pred_hi is the greatest FC temperature that is predicted during the interval in which FC temperature is predicted. Tstck_limit is a FC temperature threshold. Timestck_pred_hi is a time where the predicted FC temperature is greatest during the predetermined time interval in which FC temperature is predicted. Time_battderate_hi is a time where battery derating (e.g., reduction in power output) is predicted.

At 546, method 500 increases a maximum threshold for the FC power request and constrains battery power usage. By increasing the maximum threshold for FC power request, the FC power request may achieve higher values and it may cause the FC power output to increase to higher levels than a baseline FC threshold. Method 500 proceeds to exit.

At 550, method 500 maintains the baseline energy management strategy which includes applying a baseline FC temperature threshold a baseline traction battery temperature threshold. Method 500 proceeds to exit.

At 560, method 500 estimates the amount of FC power that is predicted to be consumed from the present time to the predetermined amount of time in the future. In one example, method 500 estimates the FC power consumed for the predetermined amount of time by. The amount of FC power that is consumed for a particular travel route segment may be determined by multiplying the amount of vehicle power consumed during the travel segment to meet driver demand by one minus a weighting factor for the battery. The weighting factor may be based on battery state of charge (SOC) and battery temperature. The weighting factor may be stored in a table or function in controller memory and the table or function may be referenced by battery SOC and battery temperature. The weighting factors (e.g., scalar real numbers that range from 0 to 1) may be empirically determined. Method 500 proceeds to 562 after battery power consumption for each travel segment of the travel route is determined.

At 562, method 500 predicts a maximum FC temperature that is predicted to be reached during the predetermined amount of time for a maximum cooling scenario for the FC and a nominal cooling scenario for the FC. Method 500 proceeds to 564.

At 564, method 500 judges whether Tstck_pred_hi−Tstck_limit>Tstck_hi_thresh AND Timestck_pred_hi<Timestck_hi_thresh to determine whether pre-cooling of the FC is desired. Tstck_pred_hi is the greatest FC temperature that is predicted during the interval in which FC temperature is predicted. Tstck_limit is a FC temperature threshold. Tstck_hi_threshd is a high temperature threshold for the FC. Timestck_pred_hi is the time that the FC is at its highest predicted value. Timestck_hi_thresh is a time threshold for the FC temperature to reach a high temperature. If method 500 judges that Tstck_pred_hi−Tstck_limit>Tstck_hi_thresh AND Timestck_pred_hi<Timestck_hi_thresh, the answer is yes and method 500 proceeds to 566. Otherwise, the answer is no and method 500 proceeds to 568.

At 566, method 500 reduces the FC cooling threshold to pre-cool the FC stack. By lowering the FC cooling threshold, the FC may operate at a lower temperature before high load conditions are met so that the FC temperature may remain below the FC maximum temperature for a longer period of time. Method 500 may also increase a humidity level in the FC cell to reduce a possibility of FC degradation during higher load conditions. The humidity level in the fuel cell and the gas to gas humidifier may be increased by increasing a pressure within the gas to gas humidifier (e.g., adjusting compressor speed), decrease a flow through the gas to gas humidifier (e.g., adjusting throttle position), and decreasing a temperature within the gas to gas humidifier. To lower the FC cooling threshold temperature, method 500 may cause one or more of the following actions: increase coolant flow through coolant pump 234 by increasing speed of coolant pump 234, increasing coolant flow through coolant pump 234 via adjusting valve 230. Method 500 proceeds to exit.

At 568, method 500 judges whether Tstck_pred_nom−Tstck_limit<Tstck_lo_thresh AND Timestck_pred_nom<Timestck_lo_thresh? where Tstck_pred_nom is the nominal temperature of the FC during the predetermined time interval. Tstck_limit is a FC temperature threshold. Tstck_lo_thresh is a low temperature threshold for the fuel cell. Timestck_pred_nom is the time that the FC is at the nominal temperature. Timestck_lo_thresh is a time where FC is at the low temperature threshold. If method 500 judges that Tstck_pred_nom−Tstck_limit<Tstck_lo_thresh AND Timestck_pred_nom<Timestck_lo_thresh, the answer is yes and method 500 proceeds to 570. Otherwise, the answer is no and method 500 proceeds to 572.

At 570, method 500 increases the FC cooling threshold to delay FC stack cooling. It may be desirable to delay FC stack cooling to reduce power consumptions during operating conditions where the likelihood of battery over temperature is low. By increasing the FC cooling threshold, TC temperature may be increased to a higher level. Method 500 proceeds to exit.

At 572, method 500 maintains the present FC cooling threshold. The FC cooling threshold is maintained so that nominal FC cooling is provided so that FC temperature may be controlled within a desired range of temperatures. Method 500 proceeds to exit.

In this way, method 500 may adjust battery cooling, adjust FC cooling, reducing a maximum FC power request, increase a traction battery SOC, and adjust a power split between a battery and a FC to manage energy use and thermal energy of a FC vehicle.

Thus, the method of FIGS. 5-7 provides for a method for operating a vehicle that includes a fuel cell (FC), comprising: via a controller, adjusting a temperature of the FC at a present time in response to a section of a travel route the vehicle is predicted to travel at a future time. In a first example, the method includes where the temperature is adjusted via lowering a threshold temperature of the FC. In a second example that may include the first example, the method includes where lowering the threshold temperature causes an increase in coolant flow through the FC. In a third example that may include one or both of the first and second examples, the method further comprises adjusting a temperature of a traction battery in response to the section of the travel route the vehicle is predicted to travel at the future time. In a fourth example that may include one or more of the first through third examples, the method includes where the temperature of the traction battery is lowered via lowering a temperature threshold of the traction battery. In a fifth example that may include one or more of the first through fourth examples, the method includes where the section of the travel route is where load on the FC is predicted to increase. In a sixth example that may include one or more of the first through fifth examples, the method includes where the section of the travel route where the vehicle is predicted to travel is determined via a navigation system.

Figure 8B:
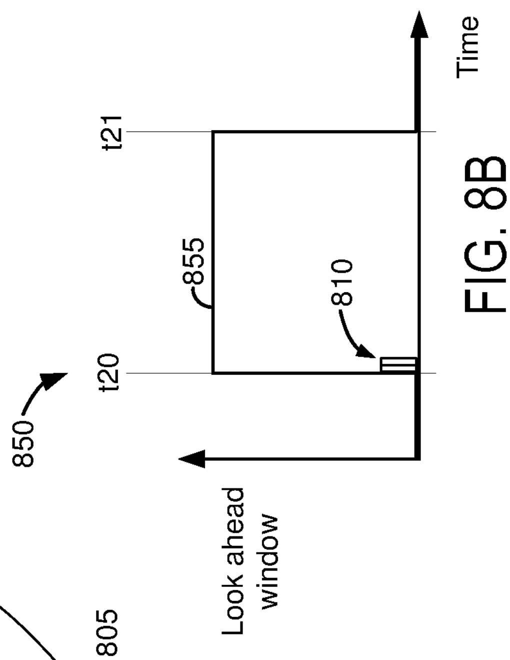
FIGS. 8A and 8B show how a travel route may be divided or partitioned into a plurality of segments so that vehicle power may be determined.
Figure 8A:
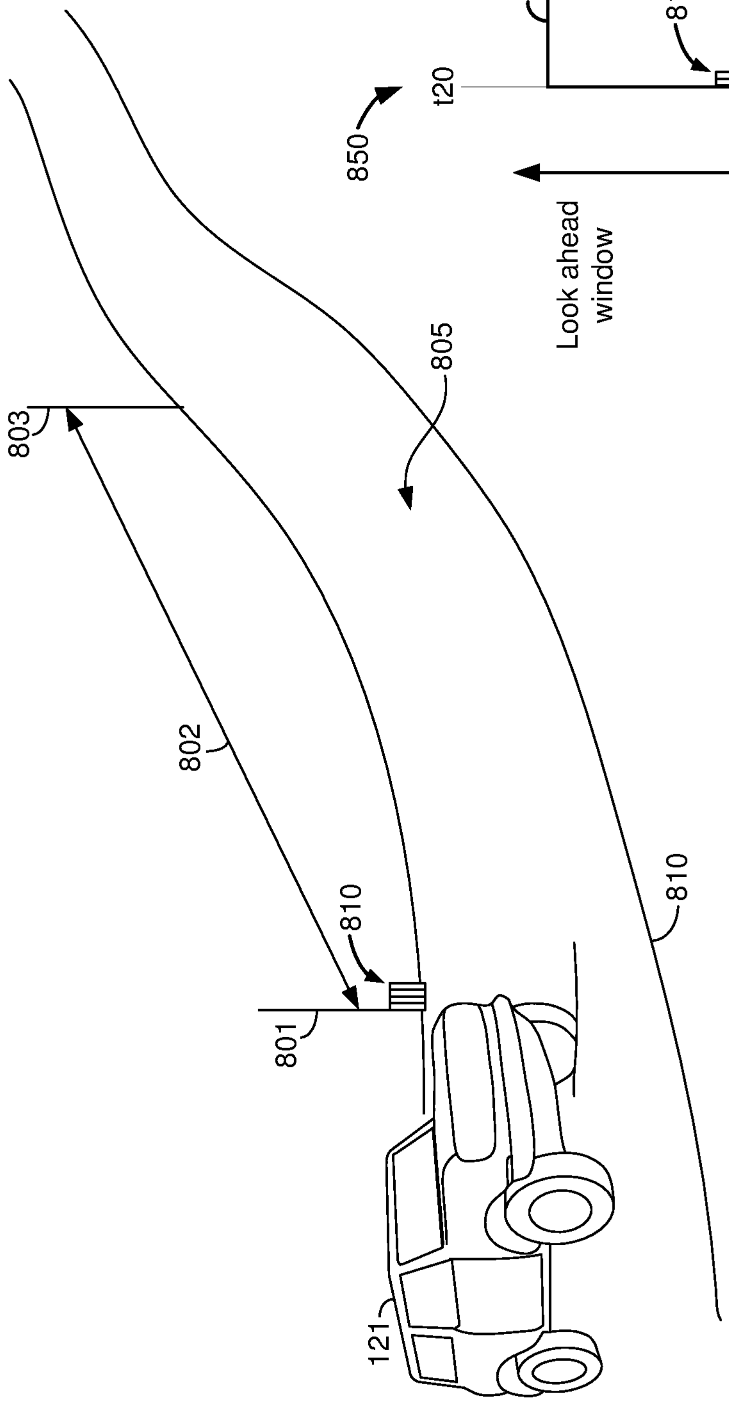

Referring now to FIG. 8A, a diagram illustrating a look ahead window and travel path is shown. Vehicle 121 may travel on road 810 which may be part of a longer travel path 805. The travel path 805 may include a plurality of roads that are between the present position of the vehicle 801 and the vehicle's destination (not shown). Look ahead window 802 may represent a time or distance that may be traveled by vehicle 121 in a predetermined amount of time (e.g., 20 minutes). For example, look ahead window 802 may be a distance or travel time from the vehicle's present location 801 to a predetermined distance (e.g., 100 meters) 803 in the vehicle's path. The look ahead window may be divided or partitioned into a plurality of travel route segments 810 and vehicle operating conditions may be estimated according to the travel path characteristics that are present in a particular segment. For example, a travel route segment may be a section of road that has a 1% grade and a speed constraint of 100 kilometers/hour.

On the other hand, look ahead window 802 may represent a predetermined amount of time that extends into the future, the time beginning at a present time and ending a predetermined amount of time into the future. A time based look ahead window is illustrated in FIG. 8B. Plot 850 includes a vertical plot that represents the look ahead window state and the look ahead window is active when trace 855 is at a higher level that is near the vertical axis arrow. The horizontal axis represents time and time increases from the left side of the plot to the right side of the plot. The look ahead window that is based on time may be divided into travel route segments 810 as shown. At time t20, the look ahead window is activated and vehicle operating conditions for the duration of the predetermined amount of time may be determined. At time t21, the look ahead window is deactivated.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A vehicle system, comprising:

a fuel cell (FC);

a traction battery;

a coolant pump configured to supply coolant to the FC; and a controller including executable instructions stored in non-transitory memory that cause the controller to decrease a temperature of the FC at first time in response to a section of a travel route where a load on the FC is predicted to increase at a second time, and decrease a temperature of the traction battery in response to the section of the travel route where the load on the FC is predicted to increase at the second time, and where the second time is a predetermined amount of time after the first time, and increase a state of charge (SOC) of the traction battery at the first time in response to the section of the travel route where the FC is predicted to increase at the second time, such that the traction battery is configured to supply a greater share of power during the section of the travel route where the load on the FC is predicted to increase at the second time, thereby reducing the load on the FC and maintaining a temperature of the FC below a maximum FC temperature threshold.

2. The vehicle system of claim 1, where the section of the travel route is a distance away from a present position of a vehicle that includes the FC, and further comprising:

a gas to gas humidifier in fluidic communication with the FC; and additional executable instructions that cause the controller to increase a pressure within the gas to gas humidifier, decrease a pressure within the gas to gas humidifier, and decrease a flow through the gas to gas humidifier to increase humidity within the FC at the first time in response to the section of the travel route where the load on the FC is predicted to increase at the second time.

3. The vehicle system of claim 1, where the temperature of the FC is decreased via increasing a flow rate of a coolant to the FC and a radiator fan speed.

4. The vehicle system of claim 1, where the temperature of the FC is decreased via adjusting a position of a valve.

5. The vehicle system of claim 1, where the controller is further configured to: adjust a power split between the FC and the traction battery at the first time by decreasing a maximum threshold FC output power and increasing a maximum threshold battery output power in response to the section of the travel route where the load is predicted to increase.

6. The vehicle system of claim 1, where the temperature of the traction battery is reduced via adjusting a position of an expansion valve.

7. The vehicle system of claim 6, where a refrigerant is expanded through the expansion valve.

8. The vehicle system of claim 7, where the refrigerant cools a coolant that flows through the traction battery.

9. A method for operating a vehicle that includes a fuel cell (FC), comprising:

via a controller, adjusting a temperature of the FC at a present time in response to a section of a travel route the vehicle is predicted to travel at a future time, where the section of the travel route is where load on the FC is predicted to increase at the future time, adjusting a temperature of a traction battery in response to the section of the travel route the vehicle is predicted to travel at the future time, and increase a state of charge (SOC) of the traction battery at the present time in response to the section of the travel route where the FC is predicted to increase at the future time, such that the traction battery is configured to supply a greater share of power during the section of the travel route where the load on the FC is predicted to increase at the future time, thereby reducing the load on the FC and maintaining a temperature of the FC below a maximum FC temperature threshold, where adjusting the temperature of the traction battery comprises:

deriving a maximum battery temperature predicted to occur during the section of the travel route;

comparing the maximum battery temperature to a battery temperature threshold; and adjusting a position of an expansion valve to reduce the temperature of the traction battery when the maximum battery temperature exceeds the battery temperature threshold, where the temperature of the traction battery is lowered via lowering a temperature threshold of the traction battery.

10. The method of claim 9, where the temperature is adjusted via lowering a threshold temperature of the FC.

11. The method of claim 10, where lowering the threshold temperature causes an increase in coolant flow through the FC.

12. The method of claim 9, where adjusting the temperature of the traction battery comprises:

determining that at a time at which the maximum battery temperature is predicted to occur is less than a time threshold for a high battery temperature; and where the position of the expansion valve is adjusted to reduce the temperature of the traction battery only when both the maximum battery temperature exceeds the battery temperature threshold and the time at which the maximum battery temperature is predicted to occur is less than the time threshold for the high battery temperature.

13. The method of claim 9, where adjusting the position of the expansion valve to reduce the temperature of the traction battery further comprises increasing a speed of a compressor that circulates refrigerant through the expansion valve.

14. The method of claim 9, where the section of the travel route where the vehicle is predicted to travel is determined via a navigation system.

15. A vehicle system, comprising:

a fuel cell (FC);

a coolant pump configured to supply coolant to the FC;

a traction battery; and a controller including executable instructions stored in non-transitory memory that cause the controller to:

segment a travel route into a plurality of travel route segments, each travel route segment corresponding to one of a predetermined travel route distance and a predetermined travel time;

determine a predicted power consumption for each of the plurality of travel route segments;

determine a predicted battery temperature using levels of constant heat transfer between the traction battery and a battery coolant;

normalize battery temperature predictions using a plurality of battery cell temperature predictions, the plurality of battery cell temperature predictions corresponding to the levels of constant heat transfer, where normalizing the battery temperature predictions comprises, in response to an observed level of heat transfer between the traction battery and the battery coolant being between a first threshold level of heat transfer and a second threshold level of heat transfer, calculating a normalized battery cell temperature prediction by interpolating between a first battery cell temperature prediction corresponding to the first threshold level of heat transfer and a second battery cell temperature prediction corresponding to the second threshold level of heat transfer;

adjust a power split between the FC and the traction battery at a first vehicle position based on the predicted power consumption and the normalized battery temperature predictions, the first vehicle position ahead of a second vehicle position along the travel route, the second vehicle position being a segment of the plurality of travel route segments where a load on a vehicle that includes the FC and the traction battery is predicted to increase; and increase a state of charge (SOC) of the traction battery at a first time in response to a segment of the plurality travel route segments where a load on the FC is predicted to increase at a second time, such that the traction battery is configured to supply a greater share of power during the segment of the plurality of travel route segments where the load on the FC is predicted to increase at the second time, thereby reducing the load on the FC and maintaining a temperature of the FC below a maximum FC temperature threshold.

16. The vehicle system of claim 15, where adjusting the power split includes increasing a maximum threshold FC output power.

17. The vehicle system of claim 16, where adjusting the power split includes decreasing a maximum threshold battery output power.

18. The vehicle system of claim 15, where adjusting the power split includes decreasing a maximum threshold FC output power.

19. The vehicle system of claim 18, where adjusting the power split includes increasing a maximum threshold battery output power.

* * * * *